US009300975B2

(12) United States Patent
Jagannathan et al.

(10) Patent No.: US 9,300,975 B2
(45) Date of Patent: Mar. 29, 2016

(54) CONCURRENT ACCESS SHARED BUFFER IN A VIDEO ENCODER

(75) Inventors: Shyam Jagannathan, Bangalore (IN); Naveen Srinivasamurthy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 655 days.

(21) Appl. No.: 13/490,549

(22) Filed: Jun. 7, 2012

(65) Prior Publication Data

US 2013/0064298 A1 Mar. 14, 2013

(30) Foreign Application Priority Data

Nov. 9, 2011 (IN) .......................... 3846/CHE/2011

(51) Int. Cl.
*H04N 7/32* (2006.01)
*H04N 19/433* (2014.01)
*H04N 19/43* (2014.01)

(52) U.S. Cl.
CPC ............. *H04N 19/433* (2014.11); *H04N 19/43* (2014.11)

(58) Field of Classification Search
CPC ........... H04N 7/32; H04N 7/50; H04N 7/364; H04N 7/26277; H04N 7/462
USPC ............ 375/240, 240.12–240.17; 710/20–22, 710/52–57; 711/101
See application file for complete search history.

(56) References Cited

U.S. PATENT DOCUMENTS

| 6,026,217 | A | * | 2/2000 | Adiletta | 709/247 |
| 6,636,222 | B1 | * | 10/2003 | Valmiki et al. | 345/505 |
| 6,751,256 | B1 | * | 6/2004 | Nickel | 375/240.01 |
| 7,116,831 | B2 | * | 10/2006 | Mukerjee et al. | 382/236 |
| 2003/0194010 | A1 | * | 10/2003 | Mukerjee et al. | 375/240.16 |
| 2005/0105616 | A1 | * | 5/2005 | Kim et al. | 375/240.12 |
| 2007/0280352 | A1 | * | 12/2007 | Mitchell | 375/240.12 |
| 2008/0031335 | A1 | * | 2/2008 | Inoue | 375/240.16 |
| 2010/0284464 | A1 | | 11/2010 | Nagori et al. | |
| 2011/0317762 | A1 | | 12/2011 | Sankaran | |
| 2012/0287987 | A1 | * | 11/2012 | Budagavi et al. | 375/240.02 |

* cited by examiner

*Primary Examiner* — Mohammed Rahaman
*Assistant Examiner* — Jimmy S Lee
(74) *Attorney, Agent, or Firm* — Robert D. Marshall, Jr.; Frank D. Cimino

(57) ABSTRACT

A video encoder includes a buffer, a DMA engine, a motion estimator and a motion compensator. The buffer includes four pages where macroblocks are stored. The motion estimator generates a motion vector for a given macroblock. The motion compensator applies the motion vectors generated by the motion estimator to a previously encoded frame. Each of the four pages is concurrently accessed by one of the motion estimator, the motion compensator, and a channel of the DMA engine. Simultaneously the motion compensator accesses one page of the buffer containing a first set of macroblocks, the motion estimator accesses a second page of the buffer containing a second set of macroblocks, a first DMA engine channel writes a different set of macroblocks to a third page of the buffer and a second DMA engine channel writes another set of macroblocks to a fourth page of the buffer.

3 Claims, 2 Drawing Sheets

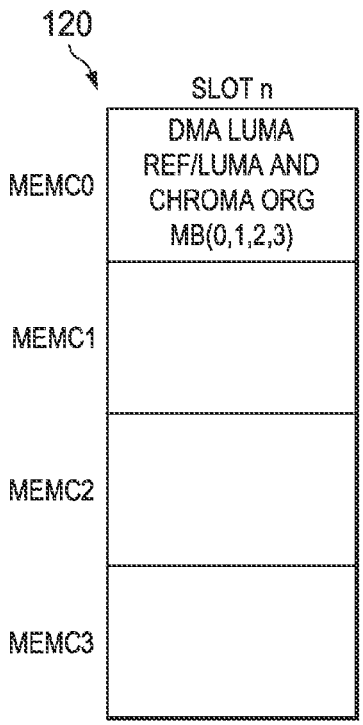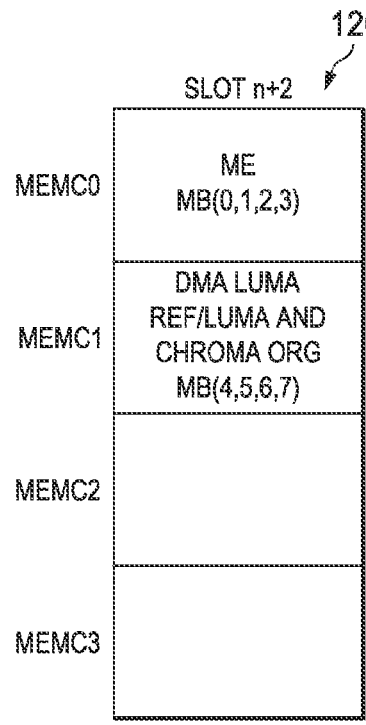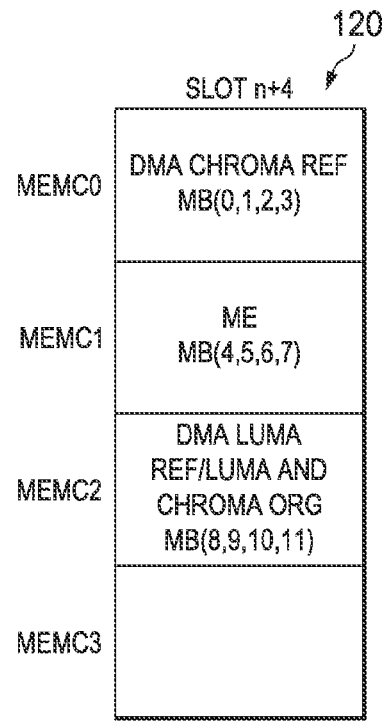
FIG. 2A  FIG. 2B  FIG. 2C
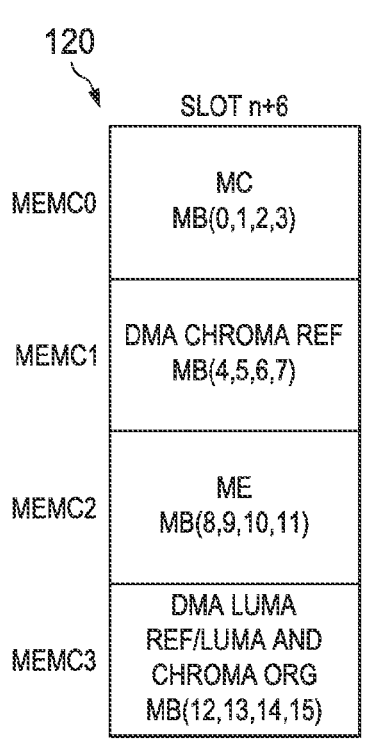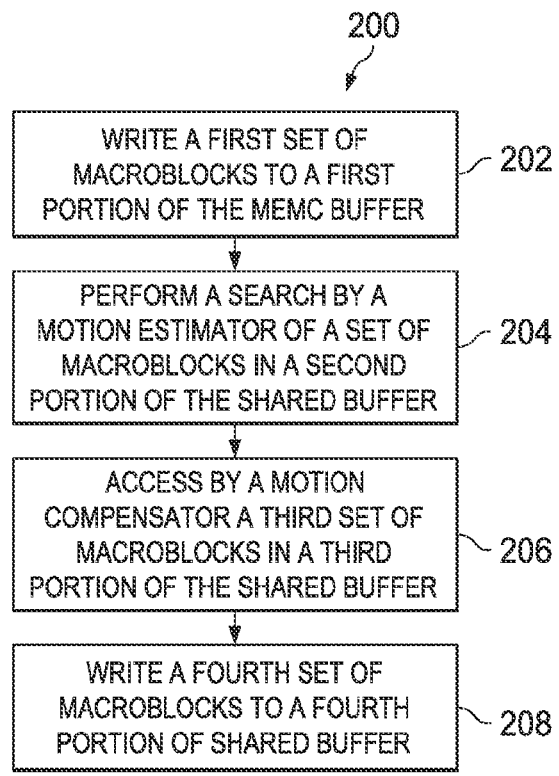
FIG. 2D  FIG. 3

CONCURRENT ACCESS SHARED BUFFER IN A VIDEO ENCODER

CROSS-REFERENCE TO RELATED APPLICATION

The present application claims priority to India Provisional Patent Application No. 3846/CHE/2011, filed on Nov. 9, 2011; which is hereby incorporated herein by reference.

BACKGROUND

High definition (HD) video comprises numerous macroblocks per frame. For 1080p video, there are 8160 16×16 pixel macroblocks. Thus 8160 macroblocks must be decoded 30 times per second, thereby imposing a significant performance burden on the encoder. Video encoders often are constructed in a pipeline fashion to improve throughput, but additional performance improvements may be desirable.

SUMMARY

Various embodiments are directed to a buffer in a video encoder that is concurrently shared by multiple (e.g., three) entities involved in encoding video. The masters may include, for example, a direct memory access (DMA) engine, a motion estimator, and a motion compensator. By using a buffer that is concurrently accessible by multiple entities, no one entity is forced to wait on access to the buffer. Accordingly, the video encoder operates more efficiently.

Some embodiments are directed to a video encoder that includes a buffer, a DMA engine, a motion estimator and a motion compensator. The buffer includes four pages in which macroblocks of video are stored. The motion estimator generates a motion vector for a given macroblock stored in the buffer. The motion compensator uses the motion vectors to perform interpolation if needed. For a given time slot, each of the four pages is concurrently accessed by one of the motion estimator, the motion compensator, and a channel of the DMA engine. Further, for each such time slot, the motion compensator accesses one page of the buffer containing a first set of macroblocks, while the motion estimator accesses another page of the buffer containing a second set of macroblocks, and while one of the DMA engine channels writes yet a different set of macroblocks to another page of the buffer and another of the DMA engine channels writes another set of macroblocks to another page of the buffer.

Other embodiments are directed to a method that includes writing a first set of macroblocks of video data to a first portion of a shared buffer in a video encoder, performing a search by a motion estimator of a second set of macroblocks of video data in a second portion of the shared buffer, and accessing, by a motion compensator, a third set of macroblocks of video data in a third portion of the shared buffer. The various actions of writing, performing and accessing all occur concurrently.

Still other embodiments are directed to a video encoder that comprises a buffer comprising four pages in which macroblocks of video are stored, a motion estimator to generate a motion vector for a given macroblock stored in the buffer, and a motion compensator to use the motion vectors generated by the motion estimator to perform interpolation. For a given time slot, each of the four pages is concurrently accessible by one of the motion estimator, the motion compensator, and a channel of a direct memory access (DMA) engine.

BRIEF DESCRIPTION OF THE DRAWINGS

For a detailed description of exemplary embodiments of the invention, reference will now be made to the accompanying drawings in which:

FIGS. 2A-2D illustrate the use of a buffer by multiple masters to improve performance of a video encoder; and FIG. 3 shows a method in accordance with a preferred embodiment.

NOTATION AND NOMENCLATURE

Figure 1:
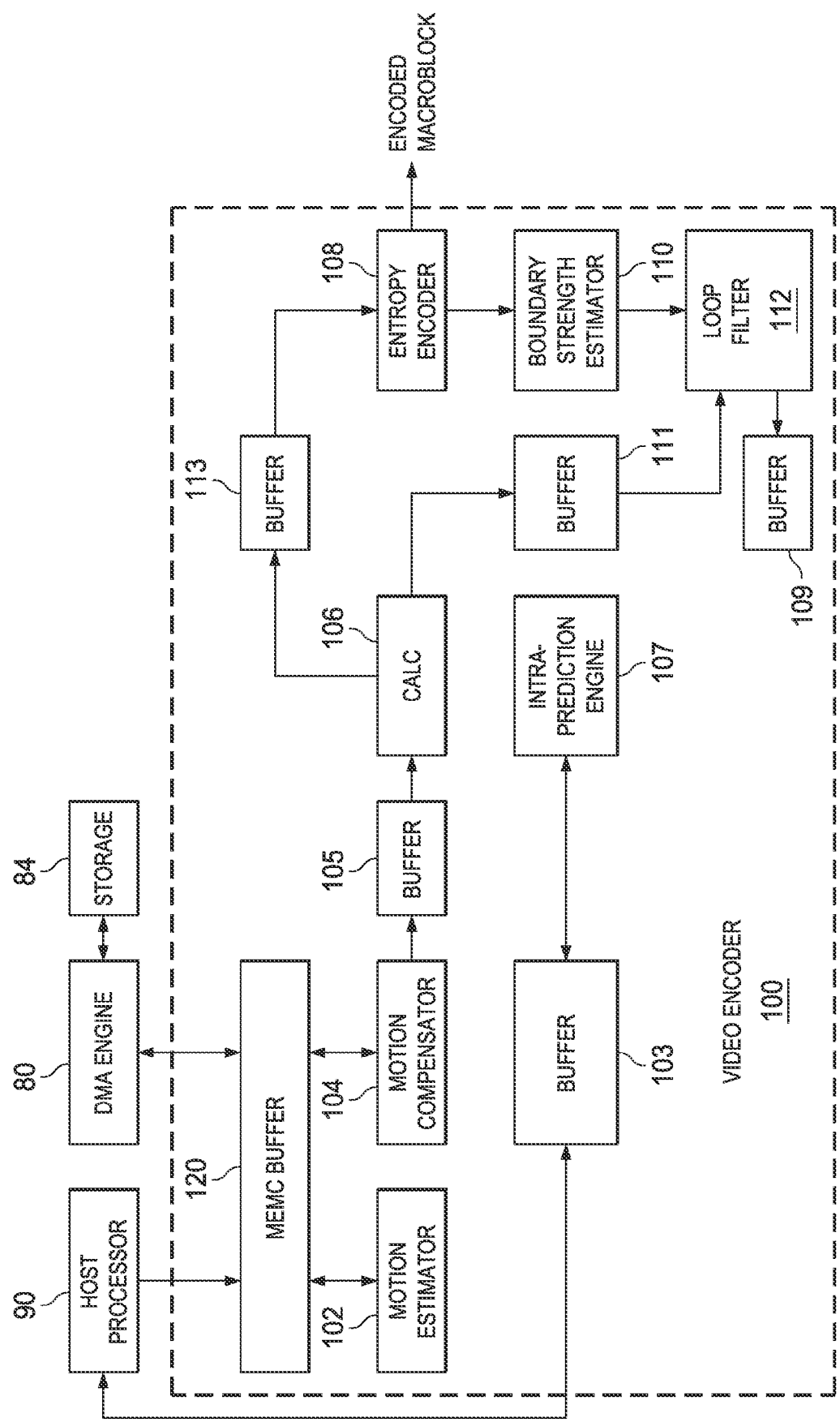
FIG. 1 shows a system diagram of a video encoder in accordance with various embodiments.

Certain terms are used throughout the following description and claims to refer to particular system components. As one skilled in the art will appreciate, companies may refer to a component by different names. This document does not intend to distinguish between components that differ in name but not in function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The term "macroblock" is used herein to represent a group of pixels to be rendered on a display. A macroblock may be a 16×16 group of pixels, but can be a different size and need not be square in other embodiments. A frame of video data is represented by multiple macroblocks.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a block diagram of a video encoder 100 in accordance with various embodiments. The encoder 100 includes a motion estimator 102, a motion compensator 104, a calculation engine (CALC) 106, an intra-prediction engine 107, an entropy encoder 108, a boundary strength estimator 110, and a loop filter 112. The embodiments discussed herein.

Motion estimator 102 and motion compensator 104 cooperate to provide macroblock inter-frame predictions (i.e., temporal predictions). Motion estimator 102 searches a previous frame for a matching macroblock to each macroblock in a current frame and generates a motion vector for a given macroblock based on a closest match for the macroblock in a previously encoded frame. Motion estimator 102 writes the motion vector at a common offset in MEMC buffer 120 agreed upon by motion estimator 102 and MG motion compensator 104. Motion compensator 104 applies the motion vector produced by motion estimator 102 to the previously encoded frame to generate an estimate of the given macroblock.

Intra-prediction engine 107 analyzes a given macroblock with reference to one or more adjacent macroblocks in the same frame. For example, when encoding a given macroblock, intra-prediction engine 107 may analyze a macroblock directly above (upper macroblock), a macroblock to the right of the upper macroblock (upper right macroblock), a macroblock to the left of the upper macroblock (upper left macroblock), and a macroblock immediately to the left of the given macroblock (left macroblock) to provide spatial predictions. Intra-prediction engine 107 generates a spatial activity metric which it stores in buffer 103. Based on the analysis, intra-prediction engine 107 selects one of a plurality of intra-prediction modes for application to the given macroblock.

In addition to the motion vector, the ME motion estimator 102 generates another metric known as the Sum of Absolute Differences (SAD). The SAD is the sum of the absolute differences between pixels in a current macroblock and corresponding pixels in a reference macroblock. Host processor 90 reads the spatial activity metric generated by intra-prediction engine 107 via buffer 103 and the SAD generated by motion estimator 102 and performs a mode decision. In the mode decision, host processor 90 determines whether the current macroblock is to be encoded using either an intra-block encoding technique or an inter-block encoding technique. After making this mode decision, host processor 90 programs CALC engine 106 and entropy encoder 108 to encode each macroblock in accordance with the mode decision made for the macroblock.

In accordance with at least some embodiments of the invention, the intra mode is fixed at 16×16 (one of the four 16×16 modes per the H.264 standard) so that intra-prediction engine 107 does not have to spend cycles to decide the mode. Further, intra-prediction engine 107 preferably is programmed to provide a measure of spatial activity of the current block which is used to compare against a SAD of the motion compensated block.

If the mode decision made by host processor 90 is to inter-block encode a given macroblock, CALC engine 106 reads interpolated (or motion compensated) luminance and chrominance values from a buffer 105 shared between motion compensator 104 and CALC engine 106. CALC engine 106 is given a copy of the current macroblock (also referred as the "original" macroblock) by host processor 90 using DMA engine 80. CALC engine 106 takes the difference between motion compensated pixels and current pixels to produce residuals. The residuals will be transformed, quantized, and saved to a buffer 113 shared between CALC engine 106 and entropy encoder 108. As quantization is a lossy process (i.e., the precision of the transformed coefficients will be lost when inverse quantization is applied), CALC engine 106 will produce a reconstructed set of pixels by performing inverse quantization and inverse transformation. CALC engine 106 will then save the reconstructed pixels in a buffer 111 shared between CALC engine 106 and loop filter 112. The reconstructed pixels will be filtered by loop filter 112 based on the boundary strengths provided by boundary strength estimator 110. Loop filter 112 saves the filtered data to a buffer 109 which is accessible also by DMA engine 80.

If the mode decision made by host processor 90 is to intra-block encode a given macroblock, CALC engine 106 reads the intra mode and performs intra prediction for the mode for which it has been programmed. CALC engine 106 computes the difference between intra-predicted pixels and current pixels and produces the residuals. The residuals will be transformed, quantized, and saved into buffer 113. As noted above, quantization is a lossy process and thus CALC engine 106 will produce a reconstructed set of pixels by performing inverse quantization and inverse transformation. CALC engine 106 will then save the reconstructed pixels into buffer 111. The reconstructed pixels will be filtered by loop filter 112 based on the boundary strengths provided by boundary strength estimator 110. Loop filter 112 saves the filtered data to buffer 109 at the end for DMA engine 80 to store in external memory.

Entropy encoder 108 receives the transformed quantized residuals, and applies a suitable coding technique. For example, entropy encoder 108 may apply one of context adaptive binary arithmetic coding and context adaptive variable length coding to produce an entropy encoded macroblock.

Boundary strength estimator 110 assigns strength values to the edges of blocks within the macroblock. For example, boundary strength estimator 110 may apply strength values to the edges of 4×4 or 8×8 blocks of each macroblock. The strength values may be determined based on, for example, inter-block luminance gradient, size of applied quantization step, and difference in applied coding.

Loop filter 112 receives the strength values provided from boundary strength estimator 110 and filters the block edges in accordance with the boundary strength values. Each filtered macroblock may be stored for use by motion estimator 102 and motion compensator 104 in inter-prediction.

Referring still to FIG. 1, video encoder 100 also includes a MEMC buffer 120 that is shared by motion estimator 102 and motion compensator 104. Because the MEMC buffer 120 is shared by motion estimator 102 and motion compensator 104, the buffer is referred to as an MEMC buffer 120. MEMC buffer 120 is also shared by DMA engine 80 and/or host processor 90. Host processor 90 itself may write video data to the buffer 120 or program DMA engine 80 to write video data from storage 84 to MEMC buffer 120. Thus, MEMC buffer 120 is accessible by multiple other hardware units (e.g., motion estimator 102, motion compensator 104, DMA engine 80, and host processor 90). In the following discussion, reference is made to DMA engine 80 writing data to the buffer. References to DMA engine 80 should be construed as applicable to host processor 90 as well.

In general, DMA engine 80 writes macroblock data to MEMC buffer 120. Motion estimator 102 then performs a search on that data to determine the closest match of the macroblock to macroblocks of a previous frame. From this search and comparison, motion estimator 102 generates a motion vector and SAD. Motion compensator 104 fetches the macroblock as indicated by the motion vector to provide to CALC engine 106 and interpolates the data if necessary.

MEMC buffer 120 preferably is operated in a "four buffer mode." Four buffer mode means MEMC buffer 120 is accessed as four pages. Each page may comprise any desired size such as 8 Kbytes. Each page can be accessed by a different master than the other pages. Thus, motion estimator 102 can access one page of MEMC buffer 120, while motion compensator 104 and DMA engine 80 access other pages of MEMC buffer 120.

FIGS. 2A-2D illustrate the use of MEMC buffer 120 at various stages of macroblock processing. MEMC buffer 120 comprises four concurrently accessible pages designated as MEMC0, MEMC1, MEMC2, and MEMC3 as shown. Motion estimator 102 and motion compensator 104 are able to process four macroblocks of video data a time. The example of FIGS. 2A-2D illustrate the use of MEMC buffer 120 to process a frame of video starting with the first four macroblocks (macroblocks 0, 1, 2, and 3) and continuing with the next 12 macroblocks 4-15.

Referring first to FIG. 2A, MEMC buffer 120 initially is empty and DMA engine 80 writes macroblocks 0-3 to the first page MEMC0 at time slot n. The reference to "DMA" means that DMA engine 80 is the master of that particular page and wrote the data to the page. The reference to "Luma" means that only the luminance values of the macroblock were written by DMA engine 80. In accordance with the preferred embodiments, the motion estimator 102 search algorithm only searches luminance data, not chrominance data, based on the assumption that motion effects the chrominance data generally the same as the luminance data and thus only luminance data need be searched. The reference to "ORG" refers to the current (original) macroblocks being encoded and "REF" refers to the macroblocks from a previous frame that are used as reference macroblocks for the motion estimation algorithm.

FIG. 2B represents the state of MEMC buffer 120 at time slot n+2. DMA engine 80 writes the next four macroblocks (macroblocks 4-7) to MEMC1. The data written by DMA engine 80 preferably is, as was the case in FIG. 2A, only the luminance values for the current (ORG) and reference (REF) macroblocks 4-7. While DMA engine 80 is writing the luminance data for macroblocks 4-7, motion estimator 102 accesses the first four macroblocks 0-3 in MEMC0 previously written there by DMA engine 80 at time slot n as explained above with regard to FIG. 2A. Motion estimator 102 performs its searching algorithm on the luminance values of macroblocks 0-3.

In FIG. 2C (time slot n+4), DMA engine 80 writes the luminance values for the next set of macroblocks 8-11 to MEMC2, while motion estimator 102 accesses the previously written luminance values in MEMC1 (for macroblocks 4-7) to perform its searching algorithm. DMA engine 80 preferably has multiple DMA channels and, while one DMA channel is used to write the ORG and REF macroblocks 8-11 to MEMC2, another DMA channel is used to overwrite the ORG luminance data in MEMC0 with chrominance values ("Chroma") of the reference macroblocks for macroblocks 0-3. Thus, in FIG. 2C, MEMC0 will contain luminance and chrominance data for the reference macroblocks for macroblocks 0-3. The ORG luminance data for macroblocks 0-3 is no longer needed at this point in the preferred embodiments, and thus can be overwritten without penalty.

FIG. 2D represents the state of MEMC buffer 120 at time slot n+6. DMA engine 80 writes luminance values for the ORG and REF macroblocks 12-15 to MEMC3, while motion estimator 102 performs its searching algorithm on the previously written luminance values in MEMC2 (macroblocks 8-11). At the same time, DMA engine 80 also writes chrominance values for the reference macroblocks for macroblocks 4-7 into MEMC1. As explained above, DMA engine 80 overwrites the previously written ORG luminance values in MEMC1 with the newly written REF chrominance values for macroblocks 4-7. Motion compensator 104 accesses MEMC0 to perform interpolation as necessary. Motion compensator 104 may also apply specific weights to the pixels during interpolation as provided by, for example, host processor 90.

FIG. 2D illustrates that three different masters including DMA engine 80 (two channels), motion estimator 102, and motion compensator 104 access different pages of MEMC buffer 120. MEMC buffer 120 preferably is a circular buffer and in the next time slot n+8 (which is not shown), DMA engine 80 will cycle back around and write ORG and REF luminance values for macroblocks 16, 17, 18, and 19 to MEMC0, while motion estimator 102 searches macroblock data in MEMC3 (macroblocks 12-15), DMA engine 80 also writes chrominance REF values for macroblocks 8-11, and motion compensator 104 advances to MEMC1. As such, the various masters involves in the data writing, motion estimation and motion compensation process are not forced to wait for access to MEMC buffer 120, as otherwise would have been the case if, for example, a two buffer mode had been used for MEMC buffer 120.

FIG. 3 illustrates a method 200 in accordance with embodiments of the invention. The various actions depicted in FIG. 3 preferably are all performed concurrently. At 202, a first set of macroblocks is written to a first portion of MEMC buffer 120. This action may represent, for example, DMA engine 80 writing luminance only values to one of the MEMC pages as explained above. At 204, the method comprises performing a search by motion estimator 102 of a second set of macroblocks in a second portion of MEMC buffer 120. This action may represent motion estimator 102 searching luminance data previously written by DMA engine 80. At 206, the method includes accessing a third set of macroblocks in a third portion of MEMC buffer 120 by motion estimator 102. At 208, the method includes writing a fourth set of macroblocks to a fourth proportion of MEMC buffer 120. This action may represent DMA engine 80 writing chrominance values corresponding to the reference macroblocks.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
a buffer comprising four pages in which macroblocks of video are stored;
a direct memory access (DMA) engine comprising a plurality of channels, each DMA channel to write encoded macroblocks to the buffer;
a motion estimator to generate a motion vector for a given macroblock stored in the buffer; and
a motion compensator to use the motion vectors generated by the motion estimator to perform interpolation;
wherein, for a given time slot
a first channel of the DMA engine stores luminance and chrominance data of a first set of a predetermined number of macroblocks of a current frame and luminance data of corresponding set of macroblocks of a reference frame in a first page of the buffer, the predetermined number of macroblocks being less than a number of macroblocks in a frame,
the motion estimator accesses data of a second set of the predetermined number of macroblocks of the current frame stored in a second page of the buffer, for each macroblock stored in the second page of the buffer generates a motion vector based on a closest match for a corresponding macroblock in the reference frame from only luminance data and stores the motion vector for each macroblock in the second page of the buffer,
a second channel of the DMA engine stores chrominance data for a set of macroblocks of a reference frame corresponding to a third set of the predetermined number of macroblocks in a third page of the buffer overwriting luminance data of the third set of macroblocks of the current frame stored in the third page of the buffer, and
the motion compensator accesses data of a set of macroblocks of a reference frame corresponding to a fourth set of the predetermined number of macroblocks and motion vectors for each macroblock stored in a fourth page of the buffer, and performs interpolation for each macroblock of the current frame from luminance and chrominance data of a corresponding macroblock of the reference frame and a corresponding motion vector;

wherein for each following time slot the first channel of the DMA engine, the motion estimator, the second channel of the DMA engine and the motion compensator access a next page of the buffer in a circular sequence of pages.

2. The apparatus of claim 1, wherein:
the predetermined number of macroblocks is four macroblocks.

3. The apparatus of claim 1, wherein:
the motion estimator generates a Sum of Absolute Differences for each macroblock of a current frame and the corresponding generated motion vector;
further comprising an intra-prediction engine analyzing each macroblock of the current frame with at least one adjacent macroblock of the current frame and generating a spatial activity metric; and
a host processor connected to the motion estimator and the intra-prediction engine comparing the Sum of Absolute Differences and the spatial activity metric for each macroblock of the current frame, the host processor determining whether a macroblock is encoded employing an intra-block encoding technique or an inter-block encoding technique dependent upon a comparison of the Sum of Absolute Differences and the spatial activity metric for the macroblock.

* * * * *